United States Patent
Lazarski, Jr. et al.

(10) Patent No.: US 6,505,783 B1
(45) Date of Patent: Jan. 14, 2003

(54) METHOD FOR REHABILITATING LOW PRESSURE SERVICE MAINS CONNECTIONS

(75) Inventors: Richard M. Lazarski, Jr., LaGrange Park, IL (US); Thomas V. Gobin, Sullivan, MO (US); Alan J. Spivey, Palatine, IL (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 09/618,610

(22) Filed: Jul. 17, 2000

(51) Int. Cl.[7] .................................................. B05B 3/00
(52) U.S. Cl. ......................... 239/246; 239/269; 138/97
(58) Field of Search ............................ 239/269, 225.1, 239/246, 263.1, 263.2, 264, 265; 138/97, 98, 114

(56) References Cited

U.S. PATENT DOCUMENTS 5,964,981 A * 10/1999 Nelson et al. ................. 138/97
6,056,016 A * 5/2000 Rogers ........................ 138/97

* cited by examiner

*Primary Examiner*—Lisa A. Douglas
(74) *Attorney, Agent, or Firm*—Orum & Roth

(57) ABSTRACT

Method and apparatus for internally sealing live low pressure residential gas supply lines, including gas main tap and associated fittings, by applying sealant to the inside surface of the gas line. Sealing assemblies allow tapping and insertion of tools without gas escape to atmosphere, as well as application of sealant under gas pressure passed through a supply line which has the ability to rotate in order to feed itself through elbows and fittings to the point where sealing is required, as well as achieve uniform spray coverage of the target pipe's inner surface with sealant.

4 Claims, 4 Drawing Sheets

METHOD FOR REHABILITATING LOW PRESSURE SERVICE MAINS CONNECTIONS

BACKGROUND OF THE INVENTION

1. Field of the Invention

The invention relates to the field of pipeline repair, specifically low pressure gas line repair without service interruption.

2. Description of the Related Art

Previously, gas line repairs involved expensive and labor-intensive excavation of the gas line for replacement. Insitu gas line repair via insertion of a pipeline lining as described in British Gas plc U.S. Pat. No. 6,056,016 enables sealing via relining of a length of straight piping, but does not enable sealing or repairing of fittings creating bends in the flow path, such as the connections of the supply line to the gas main which could be, for example, a tap and elbow. The current invention solves this problem.

SUMMARY OF THE INVENTION

The invention apparatus and method are designed to allow a sealant spray coating to be applied to the inside surface of a gas main tap and/or elbow without requiring excavation of the surrounding area. Exposure of the operator to gas is minimal through the use of locking techniques so that the line, while not shut off, may have various tools inserted into it, including the spray head for applying a coating to the inside of the target area of the piping. Nitrogen is used to inflate a sealing bladder once the line has been tapped, allowing change-over from the residence supply gas and metering pipe assembly to a sealing assembly. A polyethylene hose is fed into the pipe. Within the polyethylene hose is a smaller nylon hose whose end is a steering spray head attached to a spring, the spring being rotatable via the nylon hose to allow feeding through any obstacles in the line all the way into the gas main. The steering spray head has nozzles in it through which, while it is rotating, the sealant may be applied, the rotation and spray pattern allowing complete coverage of the inside of the target pipe area. Nitrogen is also used to pressure pump the sealant down the line to the target area.

DETAILED DESCRIPTION OF THE INVENTION

Large numbers of gas main and residential gas supply lines have been installed which now requires maintenance. Often, maintenance is accomplished by digging down to the buried gas lines and physically replacing them. Often, due to labor costs, natural features or construction subsequent to the original piping installation, digging is not economically feasible. Technology exists for lining straight lengths of residential gas supply lines with polyethylene, but it cannot be extended all the way through to the gas main, therefore leaks may exist at the gas main tapping fitting, and associated service connection fittings.

Figure 1:
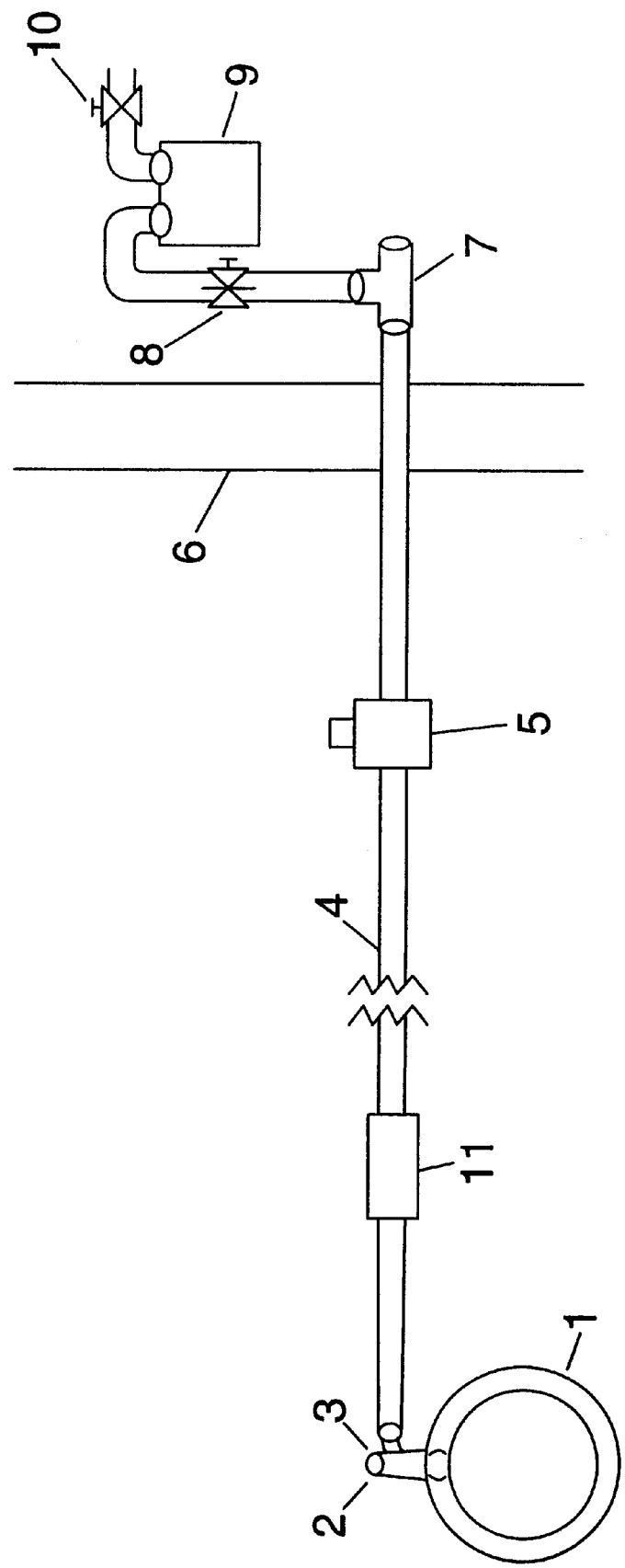
FIG. 1 is a schematic of a typical low pressure residential gas installation from the gas main to the residential gas meter.
Figure 2:
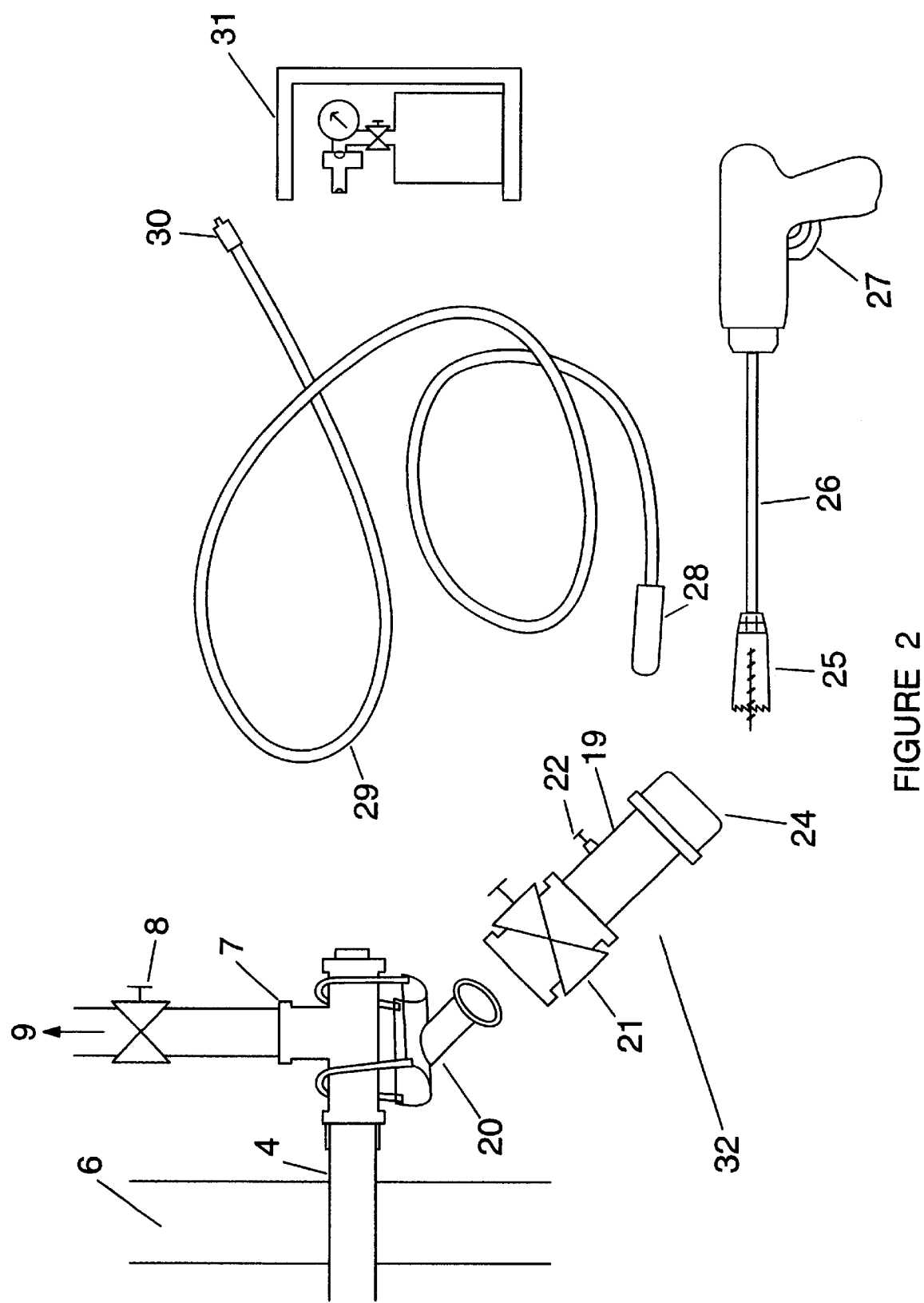
FIG. 2 is a schematic diagram of an apparatus for sealably penetrating the live gas line.

A typical low pressure residential gas installation is demonstrated by FIG. 1. The gas main 1 may be a considerable distance from the residence, the gas line residential supply line 4 typically of steel or black malleable iron piping. At the gas main, the residential gas supply line 4 will mate to the gas main 1, for example, through an elbow 3 and gas main tap 2. To repair a leak or corrosion in the area of the gas main tap 2 and elbow 3 without disconnecting service to the gas main, as shown in FIG. 1, the user will find the residential gas meter attached to the leaking line in question, and attach the clamp-on tapping fitting 20 to the first fitting 7 in the residence, as shown in FIG. 2. This will be found either below ground at the external gas meter, or if it is internal to the residence, in the basement at the first connection past the residence foundation 6 where the gas supply line 4 is coming through the basement wall. The clamp-on tapping fitting 20 comprises a metal encapsulating collar with a gasket which is held in place by chains wrapped around the target pipe. Coming off at an angle is a threaded piece to which a sealing assembly 32 is attached. An appropriately sized sealing assembly 32 and/or adapter coupling is used to mate to the desired component. The sealing assembly 32 consists of a ball valve 21, an intermediate length of piping 19 with a bleed/sample port 22 mounted into it, and a stuffing box 24. The stuffing box 24 allows the insertion of tooling while sealing around the tooling. Stuffing boxes with different internal sealing diameters are matched to the object being sealably passed through them. For ease of use, a quick release 23 may be used between the intermediate length of piping 19 and the stuffing box 24. If the quick release 23 is not used, the intermediate length of the piping 19 is unscrewed from the ball valve 21 when tooling is inserted into the sealing assembly 32.

Sealing assembly 32 is opened by unscrewing intermediate length of piping 19 from ball valve 21 to allow insertion of tapping drill bit 25. Tapping drill bit 25 has solid drive 26 which is inserted through the stuffing box 24. Then intermediate length of piping 19 is reattached, placing the tapping drill bit 25 in the sealing assembly 32 intermediate area. The drive end of solid tapping drive 26 is then attached to a pneumatic or electric drill 27. With the tapping drill bit 25 sealed within the sealing assembly 32, the ball valve 21 is opened, and the tapping drill bit 25 inserted up to the clamp-on tapping fitting 20 which guides the drill bit 25 into the target fitting 7. Once the tapping drill bit 25 has penetrated into the first fitting 7 in the residence, the tapping drill bit 25 is retrieved into the intermediate section of the sealing assembly, and the ball valve 21 is closed. Once the ball valve 21 is closed, intermediate length of piping 19 is unscrewed, and the stuffing box 24 removed along with the tapping drill bit 25.

An inflatable sealing bladder with attached polyline 29 and schrader valve 30 is connectable to nitrogen supply 31. The schrader valve 30 is inserted into stuffing box 24, and polyline 29 pulled through so that inflatable sealing bladder 28 is introduceable into the sealing assembly 32 intermediate area, and intermediate length of piping 19 reattached to the ball valve 21. Then, ball valve 21 is opened, and the inflatable sealing bladder 28 fed into gas supply line 4 to a point beyond the residence foundation 6. When activated by connection of the schrader valve 30 to nitrogen supply 31, the nitrogen supply 31 feeds nitrogen through the polyline 29 to the inflatable sealing bladder 28, inflating it, thereby sealing the gas supply line 4. The seal may be verified by checking the bleed valve/sample port 22 for pressure. If no pressure is present, the inflatable sealing bladder 28 may reasonably be assumed to have made a good seal. With the inflatable sealing bladder 28 sealing the gas supply line 4, the sealing assembly 32 may be removed, as well as the clamp-on tapping fitting 20 and the first fitting 7, and attached gas meter 9 and shut-off valve 8. Outlet valve 10 is also shown in this figure. The polyline 29 is sealed by a schrader valve 30 when it is disconnected from the nitrogen supply 31 to allow feeding through the sealing assembly 32, clamp-on fitting 20, and the first fitting 7 in the residence.

With the first fitting 7 in the residence and associated gas meter piping 8, 9 removed, an appropriately sized sealing assembly 32 is attached directly to the gas supply line 4 as it exits the residence foundation 6.

The inflatable sealing assembly is attached again with the polyline 29 of the inflatable sealing bladder 28 fed through the stuffing box 24, and the schrader valve 30 pressed to release the pressure in the inflatable sealing bladder 28, deflating it, allowing it to be pulled back to the intermediate section between stop valve 21 and the stuffing box 24. Then the ball valve 21 is closed, and the quick-release 23 opened to remove the inflatable sealing bladder and its stuffing box 24.

Figure 3:
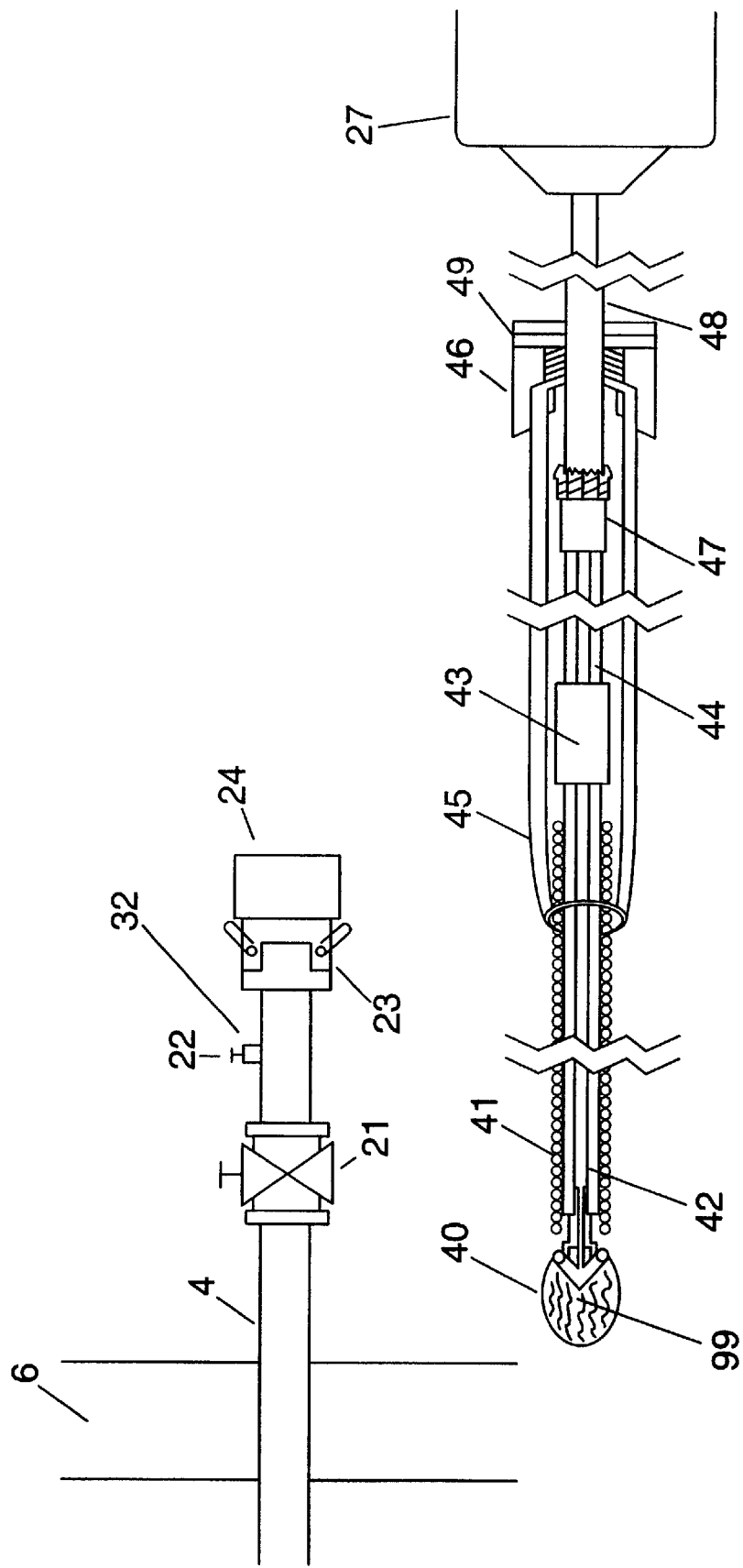
FIG. 3 is a schematic of an apparatus for feeding the sealant supply line to the target area.

As shown in FIG. 3, the feeding/sealing assembly consists of a steering spray head 40 which is attached to a pliable polyline 42 about which a spring 41, also connected to the steering spray head, is coiled up to a barbed coupling 43 which attaches the pliable polyline 42 to the stiff polyline 44, which is stiffer, allowing rotation of the drive head without shearing the polyline. In trials, "nylon 11" was used for the pliable polyline 42 and "nylon 6" was used for the stiff polyline 44. The polyline is inside a ⅝ inch polyethylene sleeve 45. The ⅝ inch size is selected to allow the passage of the assembly through a common residential gas supply line, including couplings 11, street shut-off valve 5 and a "Renu"™ repaired piping system. The stiff polyline 44 and ⅝ inch polyethylene sleeve 45 are rotatably and sealably attached at a modified service head adapter 46. The stiff polyline 44 is attached via adapter coupling 47 to a length of stainless steel tubing 48 which is connected to a pneumatic or electric drill 27. Stuffing box 49 is attached to modified service head adapter 46, sealing the outer diameter of stainless steel tubing 48. Fed through a stuffing box 24, the drive and nozzle heads and spring 41 and ⅝ inch polyethylene sleeve 45 are fed into the intermediate area between the stuffing box 24 and the ball valve 21. Then the ball valve 21 is opened, and the sealing/feeding line is fed down the piping a predetermined length (pre-measured by pipe location equipment) until a resistance is felt, indicating that the gas main elbow 3 (or other fitting equipment) until a resistance is felt, indicating that the gas main elbow 3 (or other fitting associated with the gas main 1) has been reached. Once reached, the ⅝ inch polyethylene sleeve 45 is marked with tape, for example, and then is withdrawn approximately 6 inches. A reference mark is made on the polyethylene sleeve 45 to indicate the position of the sleeve within the service line under repair. Next, the drive is turned on, and the steering head 40, while spinning, engages the edges and surfaces of the elbow, feeding around the corners, all the way to the gas main 1. The steering spray head 40 may have a friction pattern 99 on its outer surface. The spring 41 guides the polyline as it spins, preventing kinking in the pipe and abrasion against the pipe surface which might cause debris to break off and foul the line.

Figure 4:
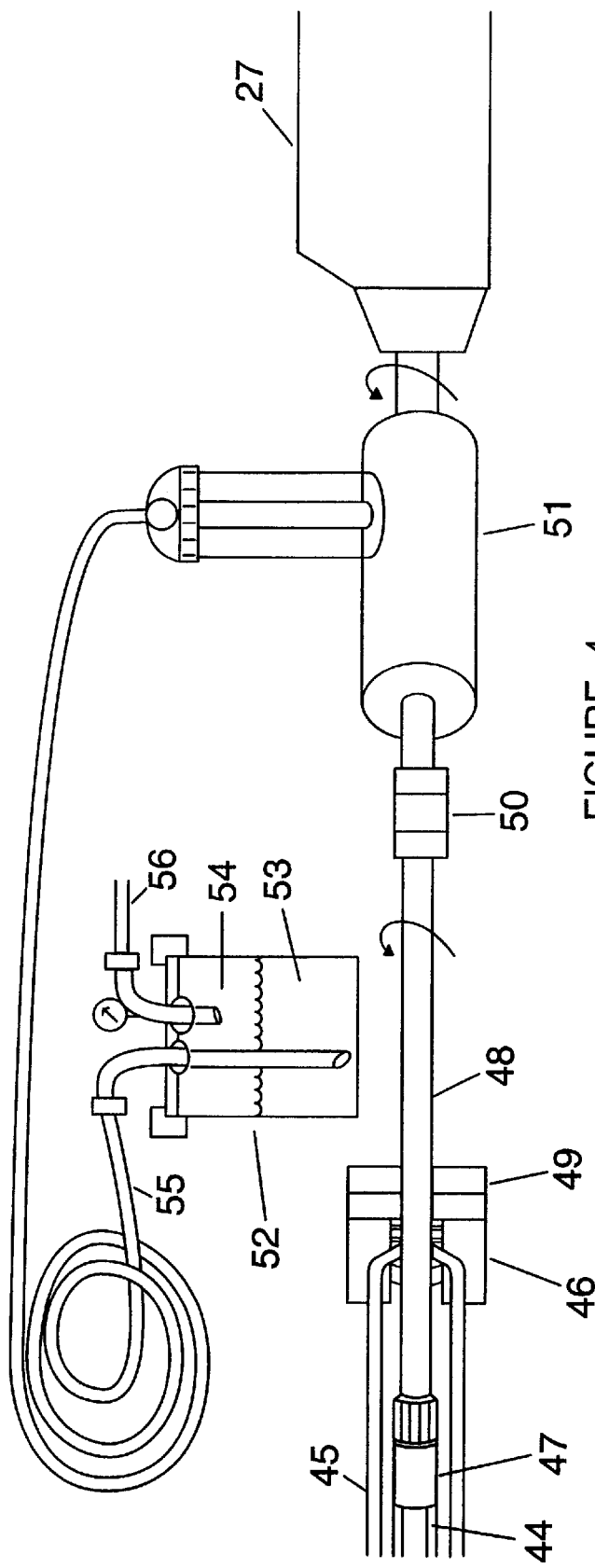
FIG. 4 is a schematic of an apparatus for applying the sealant through the piping to the target area.

Once the gas main 1 has been reached by the steering spray head 40, the sealant assembly shown in FIG. 4 is attached. The stainless steel tubing 48 is attached via adapting compression fitting 50 to the rotating union 51, which is driven by pneumatic/electric drill 27. From the rotating union 51, the polyline 55 connects to a pressure pot 52. The pressure pot uses overpressure to force a sealant 53 up the polyline to the nozzle/drive head 40. In this application, the pressure pot 52 is driven by a 50 psi nitrogen supply 31, connected via polyline 56 to nitrogen supply 31, allowing nitrogen 54 to fill the pressure pot 52, thereby forcing sealant 53 down the polyline 55 to the rotating union 51, through the rotating union 51 and up the stiff polyline 44 to the steering spray head 40. With the sealant being applied by pressure, the steering spray head 40 is spun by the pneumatic/electric drill 27 via the rotating union 51. As the sealant goes through the line and out the steering spray head 40, a spray pattern is created covering the inside of the pipe. As the line is pulled backwards, the exact coverage area may be repeatedly coated with sealant.

The sealant may be "Locktite type 290"©, "Carboline® rust bond penetrating sealer", "Vulkem 460–462", "Diamant® plastic metal", "Diamant® Dichtol", "Diamant® Ultrametal", or other polymer, resin, epoxy or urethane suitable for coating the inside of a pipe. "BYK 333"© may be used to improve substrate wetting ability. Spray coverage exists along the length of horizontal play allowed by the stainless steel tubing 48 between the rotating union 51 and the ⅝ inch polyethylene cover 45. Repeated applications over longer distances may be achieved by partially withdrawing the polyethylene sleeve 45 and enclosed polyline and covering another area. A relatively small amount of sealant is used, perhaps one-third to one-half liter of sealant for a typical multiple coating repair to a gas main tap and elbow. When pumping is nearly complete, the sealant supply may be discontinued and the sealant remaining in the polyline chased down the polyline by the nitrogen 54, thereby conserving the sealant 53. Once sealing is complete, the sealing/feeding assembly is withdrawn to the sealing assembly intermediate area and the ball valve 21 is closed. Then the stuffing box 24 with driver assembly may be released by the quick-release fitting 23.

Figure 5:
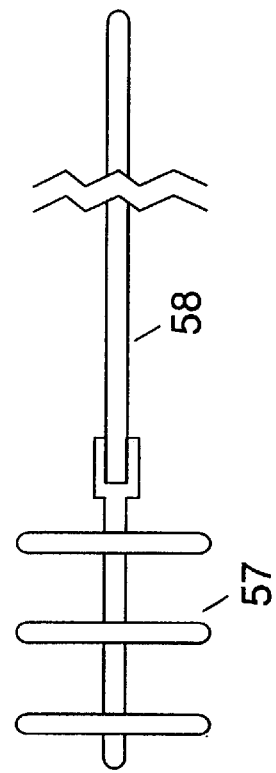
FIG. 5 is a schematic of a stuffer gasket.

To seal the repaired line during reinstallation of the residential gas meter and replacement first fitting 7, a stuffer gasket 57, 58, shown in FIG. 5, is inserted into the sealing assembly up through the stuffing box 24 to the ball valve 21. Then the ball valve 21 is opened, and the stuffer gasket 57 is inserted into the gas supply line 4, sealing it. A good seal may be verified again by checking the bleed valve/sample port 22. If no pressure exists, a good seal may be reasonably assumed to have been achieved. With the stuffer gasket 57 in place, the sealing assembly 32 may be removed. A new first fitting 7 and new residence shut-off valve 8 is installed. A sealing assembly 32 is then attached to new residence shut-off valve 8. The stuffer gasket 57, 58 is then retrieved through a new first fitting 7 in the residence and residence shut-off valve 8. As the stuffer gasket 57 clears the residence shut-off valve 8, it is closed and the repair completed.

We claim:

1. A pipe line internal surface sealing apparatus comprising:

an outer flexible pipe having first and second ends and inner and outer diameters, said outer flexible pipe's outer diameter is less than the smallest diameter of pipe line or any pipe line attached components that must be passed through, a spring having first and second ends and outer and inner diameters, said spring's outer diameter is less than said outer flexible pipe's inner diameter, an inner flexible pipe having first and second ends and an outer and inner diameter, said inner flexible pipe's outer diameter is less than said spring's inner diameter, a steering spray head having an outer surface and at least one nozzle, said spring and said inner flexible pipe's first end connected to said steering spray head, said inner flexible pipe in communication with said nozzle, said inner flexible pipe housed partially within said spring's inner diameter, and said steering spray head, spring and inner flexible pipe rotatable within said outer pipe's inner diameter, while said outer flexible pipe is stationary.

2. The apparatus of claim 1, wherein the steering spray head has a friction pattern on its outer surface.

3. The apparatus of claim 1, further comprising a modified service head adapter, said modified service head adapter attachable to said outer pipe's second end, said modified service head adapter attached to a stuffing box having a pass-through seal for said inner pipe.

4. The apparatus of claim 1, further comprising a rotatable union, said rotatable union having a stationary supply part in communication with a rotatable part sealably attachable to said inner flexible pipe's second end, and a drive shaft for rotating said rotatable part.

* * * * *